United States Patent
Chen et al.

(10) Patent No.: US 10,759,704 B2
(45) Date of Patent: Sep. 1, 2020

(54) LARGE-SIZE, HIGH-DIELECTRIC BREAKDOWN STRENGTH TITANIUM OXIDE BASED DIELECTRIC CERAMIC MATERIALS, PREPARATION METHOD AND APPLICATION THEREOF

(71) Applicant: SHANGHAI INSTITUTE OF CERAMICS, CHINESE ACADEMY OF SCIENCES, Shanghai (CN)

(72) Inventors: Ying Chen, Shanghai (CN); Xianlin Dong, Shanghai (CN); Wenbin Zhang, Shanghai (CN); Xin Li, Shanghai (CN); Feng Jiang, Shanghai (CN); Ye Huang, Shanghai (CN)

(73) Assignee: SHANGHAI INSTITUTE OF CERAMICS, CHINESE ACADEMY OF SCIENCES, Shanghai (CN)

( * ) Notice: Subject to any disclaimer, the term of this patent is extended or adjusted under 35 U.S.C. 154(b) by 3 days.

(21) Appl. No.: 16/223,445

(22) Filed: Dec. 18, 2018

(65) Prior Publication Data

US 2019/0194075 A1 Jun. 27, 2019

(30) Foreign Application Priority Data

Dec. 26, 2017 (CN) .......................... 2017 1 1431333

(51) Int. Cl.
  *C04B 35/46* (2006.01)
  *C04B 35/626* (2006.01)
  (Continued)

(52) U.S. Cl.
  CPC ............ *C04B 35/46* (2013.01); *C01G 23/003* (2013.01); *C01G 23/006* (2013.01); *C01G 23/047* (2013.01); *C04B 35/465* (2013.01); *C04B 35/62655* (2013.01); *C04B 35/62675* (2013.01); *C04B 35/62695* (2013.01);
  (Continued)

(58) Field of Classification Search
  CPC . C04B 35/46; C04B 35/456; C04B 35/62675; C04B 2235/3236; C04B 2235/604; C04B 2235/3234; C01G 23/006; H01G 4/1227
  See application file for complete search history.

(56) References Cited

U.S. PATENT DOCUMENTS

| 5,147,835 A * | 9/1992 | Franzak | C04B 35/465 |
| | | | 264/658 |
| 6,372,608 B1 * | 4/2002 | Shimoda | G02F 1/13454 |
| | | | 438/455 |
| 2006/0021308 A1 * | 2/2006 | Merkel | C04B 38/0006 |
| | | | 55/523 |

FOREIGN PATENT DOCUMENTS

CN 107473734 A 12/2017

* cited by examiner

*Primary Examiner* — Noah S Wiese
(74) *Attorney, Agent, or Firm* — Alleman Hall Creasman & Tuttle LLP

(57) ABSTRACT

The present application relates to a large-size, high-dielectric breakdown strength titanium oxide based dielectric ceramic material, a preparation method and application thereof. The composition of the titanium oxide based dielectric ceramic material comprises: a $CaTiO_3$+b $SrTiO_3$+c $TiO_2$+d $Al_2TiO_5$+e $SiO_2$, wherein a, b, c, d, and e are the mole percentage of each component, $15 \leq a \leq 35$ mol %, $0 \leq b \leq 2$ mol %, $30 \leq c \leq 84$ mol %, $0.5 \leq d \leq 25$ mol %, $0.5 \leq e \leq 15$ mol %, and a+b+c+d+e=100 mol %.

8 Claims, 6 Drawing Sheets

(51) Int. Cl.
  *C04B 35/64*      (2006.01)
  *C04B 35/634*     (2006.01)
  *C04B 35/636*     (2006.01)
  *C01G 23/00*      (2006.01)
  *C04B 35/465*     (2006.01)
  *H01G 4/12*       (2006.01)
  *C01G 23/047*     (2006.01)

(52) U.S. Cl.
  CPC ...... *C04B 35/6342* (2013.01); *C04B 35/6365* (2013.01); *C04B 35/63416* (2013.01); *C04B 35/64* (2013.01); *H01G 4/12* (2013.01); *C01P 2002/72* (2013.01); *C01P 2004/61* (2013.01); *C01P 2004/62* (2013.01); *C04B 2235/3208* (2013.01); *C04B 2235/3213* (2013.01); *C04B 2235/3217* (2013.01); *C04B 2235/3232* (2013.01); *C04B 2235/3234* (2013.01); *C04B 2235/3236* (2013.01); *C04B 2235/3418* (2013.01); *C04B 2235/604* (2013.01); *C04B 2235/6567* (2013.01); *C04B 2235/95* (2013.01); *C04B 2235/96* (2013.01)

LARGE-SIZE, HIGH-DIELECTRIC BREAKDOWN STRENGTH TITANIUM OXIDE BASED DIELECTRIC CERAMIC MATERIALS, PREPARATION METHOD AND APPLICATION THEREOF

TECHNICAL FIELD

The present application relates to a large-size, high-dielectric breakdown strength titanium oxide based dielectric ceramic material, a preparation method and application thereof, and belongs to the technical field of electronic ceramic materials.

BACKGROUND

Solid state repetitive frequency pulse technology has shown very attractive application prospects in many fields such as military (strong pulse laser, high power microwave, electromagnetic pulse weapon, etc.), scientific research (particle beam inertial confinement fusion, electron beam accelerator, strong X-ray technology, etc.), industry (chemical industry, petroleum industry, etc.), as well as biomedicine and environmental protection. Therefore, solid state transmission media has received extensive attention from the international scientific community.

Currently, there are three types of solid state transmission media: organic material/ceramic particle composites, glass ceramics, and ceramics. Organic materials usually have a very high dielectric breakdown strength ($\geq 100$ kV/mm), and organic material/ceramic particle composites also have a high dielectric breakdown strength, accordingly. However, due to the mismatch of interfaces and a great difference in thermal expansion coefficients between organic and inorganic materials, the organic material/ceramic particle composites have high dielectric losses and the dielectric properties thereof vary significantly with temperature and frequency. Although glass ceramics have a relatively high dielectric breakdown strength and dielectric constant, they have problems such as poor stability of dielectric properties and mechanical properties, and low energy density due to interface polarization. Ceramic media are preferred because they have the advantages of a high and adjustable dielectric constant, low dielectric loss, fast discharge speed, wide usage temperature range, corrosion resistance, etc. However, traditional ceramic systems have a relatively low dielectric breakdown strength. For example, a typical $TiO_2$ ceramic has a dielectric constant of 90 at normal temperature, but its dielectric breakdown strength is only 25 kV/mm, which cannot meet the needs of practical use.

SUMMARY

In view of the above problems, an object of the present invention is to provide a dielectric ceramic system which has a high dielectric breakdown strength, a suitable dielectric constant, a low dielectric loss, and stable dielectric properties with the change of temperature and frequency.

In one aspect, the present application provides a large-size, high-dielectric breakdown strength titanium oxide based dielectric ceramic material, a composition of the titanium oxide based dielectric ceramic material comprising: a $CaTiO_3$+b $SrTiO_3$+c $TiO_2$+d $Al_2TiO_5$+e $SiO_2$, wherein a, b, c, d, and e are a mole percentage of each component, $15 \leq a \leq 35$ mol %, $0 \leq b \leq 2$ mol %, $30 \leq c \leq 84$ mol %, $0.5 \leq d \leq 25$ mol %, $0.5 \leq e \leq 15$ mol %, and a+b+c+d+e=100 mol %.

In the present application, the composition of the titanium oxide based dielectric ceramic material is: a $CaTiO_3$+b $SrTiO_3$+c $TiO_2$+d $Al_2TiO_5$+e $SiO_2$ ($15 \leq a \leq 35$ mol %, $0 \leq b \leq 2$ mol %, $30 \leq c \leq 84$ mol %, $0.5 \leq d \leq 25$ mol %, $0.5 \leq e \leq 15$ mol %). $CaTiO_3$, $SrTiO_3$, and $TiO_2$ ceramic materials are currently the three most classic materials, which have relatively high dielectric constants and favorable dielectric breakdown strengths. $CaTiO_3$ ceramic has a dielectric constant of ~110, and a dielectric breakdown strength of 20 kV/mm; $SrTiO_3$ ceramic has a dielectric constant of ~300, and a dielectric breakdown strength of 10 kV/mm; and $TiO_2$ ceramic has a dielectric constant of ~90, and a dielectric breakdown strength of 25 kV/mm. Although the dielectric constant of $Al_2TiO_5$ is not high, it has a high mechanical strength and can have a pinning effect in a titanium oxide based ceramic matrix. $SiO_2$ has a dielectric constant of ~4, and a high dielectric breakdown strength of ~480 kV/mm, as well as excellent dielectric frequency stability. In addition, $SiO_2$ can function as a sintering aid to reduce the sintering temperature and increase the density and mechanical strength of the ceramics, thereby enhancing the dielectric breakdown strength of the whole ceramic. Thus, by utilizing the high dielectric constant of the titanium oxide based material, and the low dielectric constant of silicon oxide and aluminum titanate, the dielectric constant of the material can be adjusted within a wide range. By changing the stoichiometric ratio of these five compounds in combination with the optimal heat treatment process, one can expect to achieve a wide range of dielectric constant adjustment, a high dielectric breakdown strength (dielectric strength), and a favorable stability of the dielectric constant and the dielectric loss with the change temperature and frequency. The magnitude of the dielectric constant determines the pulse width of the pulse generator output, the dielectric breakdown strength determines the final accelerating field strength and high voltage withstand capability of the applied device, and the favorable stability is necessary to ensure a stable pulse output waveform, thus ensuring normal operation of the pulse system.

Preferably, the titanium oxide based dielectric ceramic material may have a size of 300 mm or greater, more preferably greater than 400 mm, in at least one dimension.

Preferably, the titanium oxide based dielectric ceramic material may have a dielectric breakdown strength of 40 to 48 kV/mm, a dielectric constant adjustable in a range of 50 to 150, and a dielectric loss of less than 0.003.

In another aspect, the present application provides a method for preparing the large-size, high-dielectric breakdown strength titanium oxide based dielectric ceramic material as described above, comprising the steps of:

weighing and mixing a calcium source, a titanium source, a strontium source, a silicon source and an aluminum source according to the composition, and presintering the mixture to obtain mixed powders;

adding a binder to the mixed powders, and subjecting the mixture to spray granulation and press molding to obtain a green body;

sintering the green body at 1220 to 1350° C. to obtain the large-size, high-dielectric breakdown strength titanium oxide based dielectric ceramic material.

Preferably, the calcium source may be at least one of CaO, $CaCO_3$, and $CaTiO_3$. The titanium source may be at least one of $TiO_2$, $SrTiO_3$, $Al_2TiO_5$, and $CaTiO_3$. The strontium source may be at least one of SrO, $SrTiO_3$, and $SrCO_3$. The silicon source may be $SiO_2$. The aluminum source may be at least one of $Al_2O_3$ and $Al_2TiO_5$.

Preferably, the presintering may be performed at 1000 to 1150° C. for a period of 2 to 12 hours. The period of the presintering may be prolonged as the quality of the prepared powders increases.

Preferably, the mixed powders may have a particle diameter of 0.2 to 1 µm.

Preferably, the binder may be at least one of polyvinyl alcohol, polyvinyl butyral, and methyl cellulose. Preferably, the binder may be added in an amount of 0.2 to 1% by weight, more preferably 0.5 to 1% by weight with respect to the total mass of the mixed powders. Preferably, the molding method may be isostatic pressing. Preferably, the pressure of the isostatic pressing may be 180 to 300 MPa.

Preferably, the period of sintering may be 2 to 24 hours.

In a third aspect, the present application also provides an application of the large-size, high-dielectric breakdown strength titanium oxide based dielectric ceramic material as described above in the preparation of a low-capacity high-frequency capacitor.

In a fourth aspect, the present application also provides an application of the large-size, high-dielectric breakdown strength titanium oxide based dielectric ceramic material as described above in the preparation of pulse forming lines.

As compared with the prior art, the present application prepares a large-size dielectric ceramic material through a conventional solid state method, which has a size of at least 300 mm in at least one dimension, for example, with a length of 300 mm, a width of 15 mm, and a thickness of 3 mm. Meanwhile, the dielectric ceramic material obtained can have a dielectric breakdown strength of 48 kV/mm, a dielectric constant of 50 to 250, and a dielectric loss of less than 0.003, which is very suitable for making low-capacity high-frequency capacitors, solid-state pulse forming lines, substrates, etc., and can be applied to electronic devices such as pulse generators, phase shifters, filters, oscillators, resonators, and phased array antennas. In addition, the material has the advantages of good frequency stability, high voltage resistance, lead-free and environmentally friendly, and simple in preparation process, and has significant application value.

DETAILED DESCRIPTION

Figure 1:
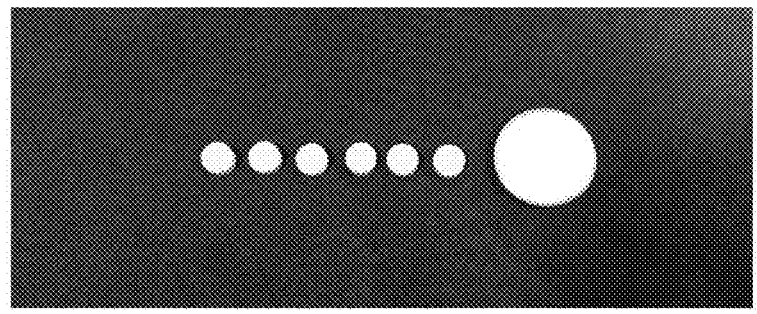
FIG. 1 is a photograph of standard ceramic sheets prepared in Examples 1-4 of the present application for measurement of microwave performance.

Selected embodiments of the present disclosure will now be described. It will be apparent to those skilled in the art from this disclosure that the following descriptions of the embodiments of the disclosure are provided for illustration only and not for the purpose of limiting the disclosure as defined by the appended claims and their equivalents.

In view of the problems existing in the prior art and market demands, the present application provides a large-size titanium oxide based dielectric ceramic material for energy storage and pulse forming under high voltage, comprising the following composition: a $CaTiO_3$+b $SrTiO_3$+c $TiO_2$+d $Al_2TiO_5$+e $SiO_2$, wherein a, b, c, d, and e are the mole percentage of each component, $15 \leq a \leq 35$ mol %, $0 \leq b \leq 2$ mol %, $30 \leq c \leq 84$ mol %, $0.5 \leq d \leq 25$ mol %, $0.5 \leq e \leq 15$ mol %, and a+b+c+d+e=100 mol %.

A titanium oxide based dielectric ceramic material prepared in the application can have a dielectric breakdown strength of 40 to 48 kV/mm, a dielectric constant adjustable in a range of 50 to 250, and a dielectric loss of less than 0.003. Moreover, the titanium oxide based dielectric ceramic material prepared in the application has a size of at least 300 mm in at least one dimension.

A preparation method for the titanium oxide based dielectric ceramic material provided by the present application is exemplarily described below.

Calcium source, titanium source, strontium source, silicon source and aluminum source are weighed according to the chemical composition of the titanium oxide based dielectric ceramic material and mixed. The mixture is subjected to presintering to obtain mixed powders. The chemical composition of the titanium oxide based dielectric ceramic material comprises (15~35) mol % $CaTiO_3$+(0~2) mol % $SrTiO_3$+(30~84) mol % $TiO_2$+(0.5~25) mol % $Al_2TiO_5$+(0.5~15) mol % $SiO_2$. The presintering is performed at a temperature of 1000° C. to 1150° C. for a period of 2 to 12 hours. The obtained mixed powders have an average particle size of 0.02 to 4 µm. The calcium source may be at least one of CaO, $CaCO_3$, and $CaTiO_3$. The titanium source may be at least one of $TiO_2$, $SrTiO_3$, $Al_2TiO_5$, and $CaTiO_3$. The strontium source may be at least one of SrO, $SrTiO_3$, and $SrCO_3$. The silicon source may be $SiO_2$. The aluminum source may be $Al_2O_3$ and/or $Al_2TiO_5$.

A binder is added to the mixed powders. Then the resulting mixture is subjected to spray granulation and press molding to obtain a green body. The binder may be at least one of polyvinyl alcohol, polyvinyl butyral, and methyl cellulose. The amount of the binder as added may be 0.2 to 5 wt %, preferably 0.5 to 1 wt % of the total mass of the mixed powders. The method of molding may be isostatic pressing, etc. The pressure of the isostatic pressing may be 180 to 300 MPa. In an example, the mixed powders and a binder are mixed, spray granulated, and then pressed into a green body by isostatic pressing at a pressure of 180 to 300 MPa.

The obtained green body is sintered at 1220 to 1350° C. and then cooled to room temperature to give the large-size titanium oxide based dielectric ceramic material. The sintering period may be from 2 to 24 hours.

The present application prepares a large-size dielectric ceramic material by a conventional solid state method, which is very suitable for making low-capacity high-frequency capacitors, solid-state pulse forming lines, substrates, etc., and can be applied to electronic devices such as pulse generators, phase shifters, filters, oscillators, resonators, and phased array antennas. In addition, the material has the advantages of lead-free and environmentally friendly, simple in preparation process, etc.

Hereinafter, the present invention will be better described with the following representative examples. It is understood that the following examples are only used to explain this invention and do not limit the scope of this invention, and any non-essential improvements and modifications made by a person skilled in the art based on this invention all fall into the protection scope of this invention. The specific parameters below are only exemplary, and a person skilled in the art can choose proper values within an appropriate range according to the description of this article, and are not restricted to the specific values cited below.

EXAMPLE 1

Figure 2:
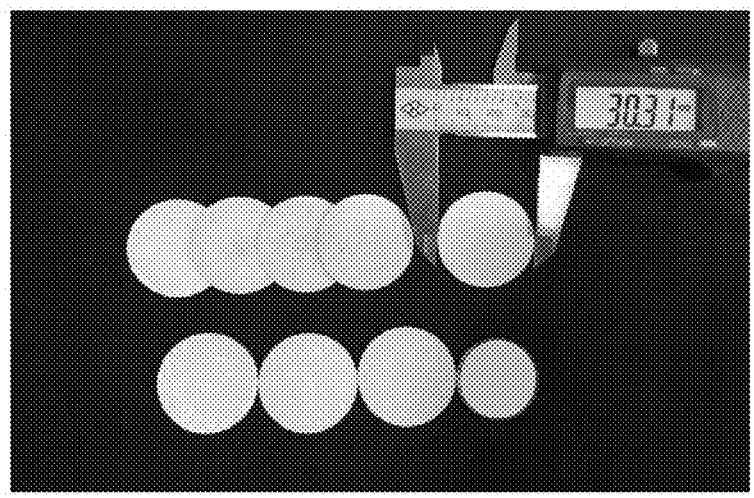
FIG. 2 is a photograph of standard ceramic sheets prepared in Examples 1-4 of the present application for measurement of dielectric constant/dielectric loss.
Figure 3:
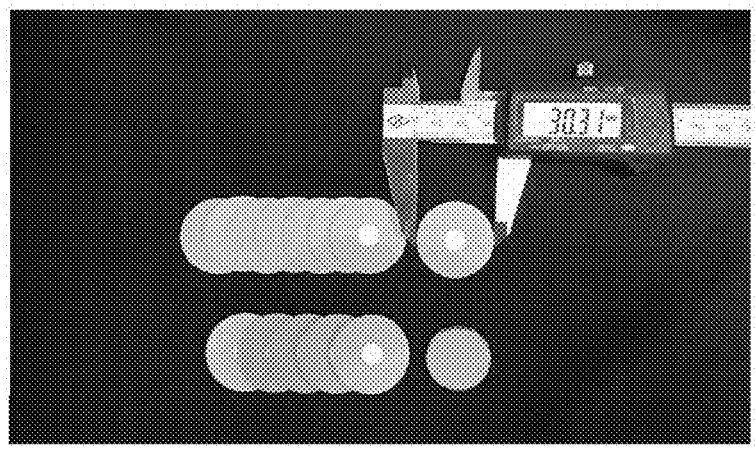
FIG. 3 is a photograph of standard ceramic sheets prepared in Examples 1-4 of the present application for measurement of dielectric strength.
Figure 4:
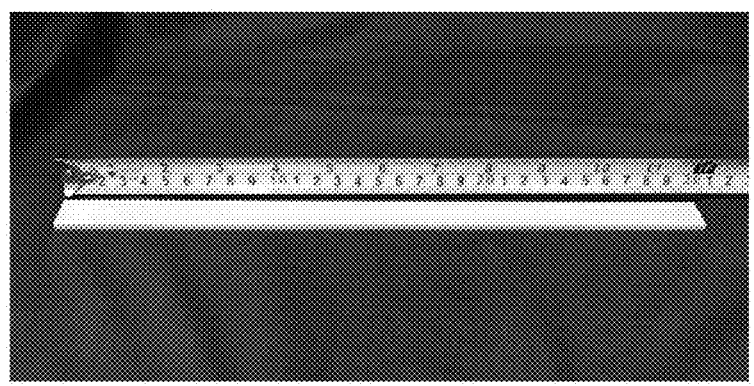
FIG. 4 shows a rectangular ceramic sheet prepared in Example 1 of the present application.
Figure 5:
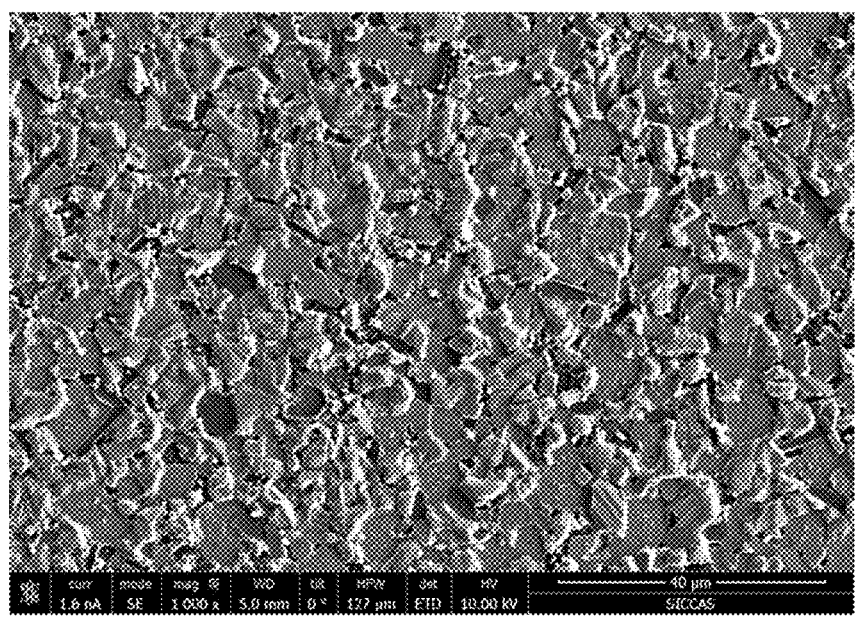
FIG. 5 is a micro-morphology image of a cross section of a ceramic material prepared in Example 1 of the present application after polishing and hot corrosion.
Figure 6:
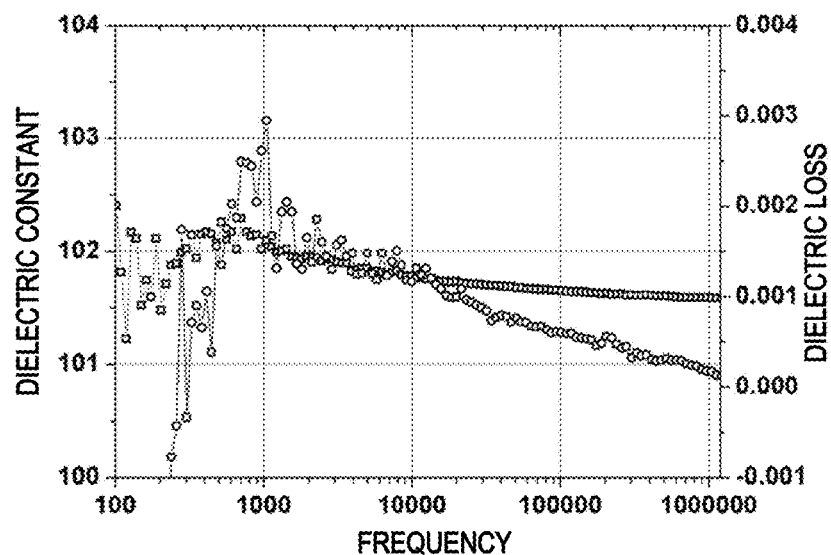
FIG. 6 shows the frequency dependence of the dielectric constant and loss of a standard ceramic sheet prepared in Example 1 of the present application.
Figure 7:
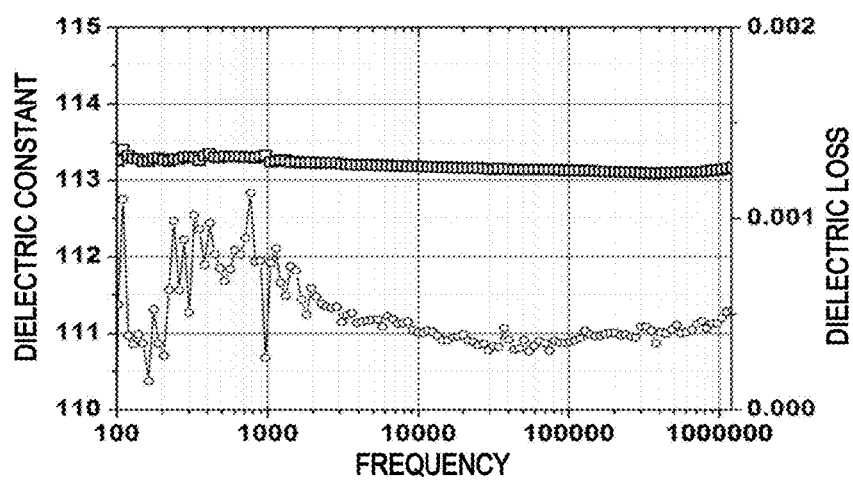
FIG. 7 shows the frequency dependence of the dielectric constant and loss of a standard ceramic sheet prepared in Example 1 of the present application.

$CaCO_3$, $TiO_2$, $SiO_2$, and $Al_2O_3$ were weighed according to the formula of 25 mol % $CaTiO_3$+61 mol % $TiO_2$+8 mol % $Al_2TiO_5$+6 mol % $SiO_2$, mixed by wet ball milling using water as the medium and agate balls as the grinding balls for 12 hours, discharged, and dried to give powders. The powders were presintered at 1100° C. for 4 hours, and then subjected to wet ball milling followed by drying, to give mixed powders having a particle size of 0.02 to 4 μm. The mixed powders were mixed with polyvinyl alcohol (PVA) at a ratio of 0.008 g PVA to 1 g mixed powders, and subjected to spray granulation, followed by isostatic pressing at a pressure of 200 MPa, to give a green body. The green body was sintered at 1250° C. for 20 hours, and then naturally cooled to room temperature to give a ceramic block. The obtained ceramic block is subjected to cutting and fine grinding to give a cylindrical ceramic sheet having a diameter of 6 mm and a thickness of 3 mm, a cylindrical ceramic sheet having a diameter of 30 mm and a thickness of 0.1 to 1 mm, and a cuboid ceramic sheet having a length of 300 mm, a width of 15 mm, and a thickness of 3 mm, respectively. The obtained ceramic sheets were coated with a silver electrode and fired, for measurements of microwave performance (see FIG. 1), dielectric properties (see FIG. 2), and dielectric strength (see FIG. 3), and for pulse forming line (see FIG. 4), respectively. FIG. 5 is a micro-morphology image of a cross section of a ceramic material prepared in this Example after polishing and hot corrosion. It can be seen from FIG. 5 that the obtained ceramic material has uniformly mixed crystal phases, and is dense, and crack free. FIG. 6 shows the frequency dependence of the dielectric constant and loss of the standard ceramic sheet (having a diameter of 30 mm and a thickness of 1 mm) prepared in this example. It can be seen from FIG. 6 that the obtained ceramic material has a dielectric constant of about 102 in a frequency range of 100 Hz to 1 MHz, which is basically constant with frequency; and a dielectric loss of less than 0.003. FIG. 7 shows the frequency dependence of the dielectric constant and loss of the cuboid ceramic sheet (having a length of 300 mm, a width of 15 mm, and a thickness of 3 mm) prepared in this example. It can be seen from FIG. 7 that the obtained ceramic material has a dielectric constant of about 113 in a frequency range of 100 Hz to 1 MHz, which is basically constant with frequency; and a dielectric loss of less than 0.0012. Table 1 shows the microwave performance data of the cylindrical ceramic sheet (having a diameter of 6 mm and a thickness of 3 mm) in this example. It can be seen that the ceramic material has excellent frequency characteristics, the dielectric constant remains unchanged at 7 GHz, and the loss is low.

TABLE 1

Microwave Performance Data of the Cylindrical Ceramic Sheet (Having a Diameter of 6 mm and a Thickness of 3 mm) in Example 1.

| Resonant Mode | Frequency | Dielectric Constant | Dielectric Loss |
| --- | --- | --- | --- |
| TE011 | 7 GHz | 102 | $7 \times 10^{-4}$ |

Figure 8:
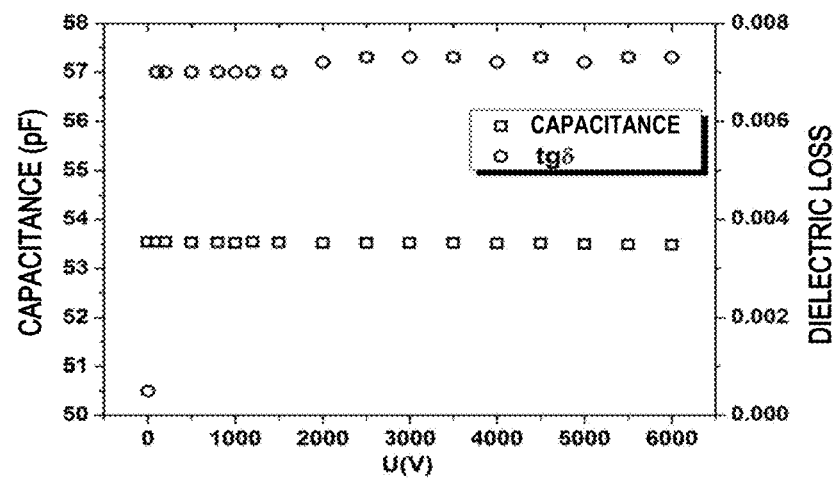
FIG. 8 shows the dielectric strength of a standard ceramic sheet prepared in Example 1 of the present application as a function of voltage.
Figure 9:
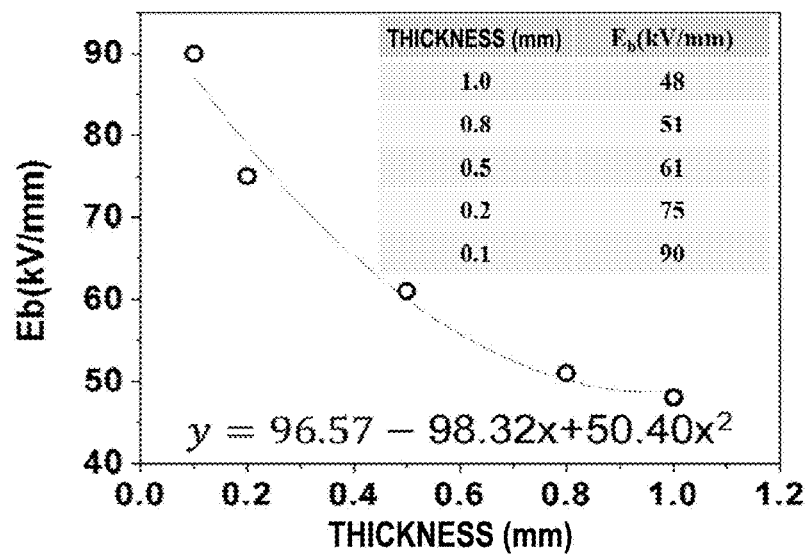
FIG. 9 shows the dielectric strength of a standard ceramic sheet prepared in Example 1 of the present application as a function of thickness.

FIG. 8 shows the dielectric properties of the standard ceramic sheet (having a diameter of 30 mm and a thickness of 1 mm) in this example as a function of voltage. It can be seen from FIG. 8 that the dielectric properties of the obtained ceramic material are stable under electric field. With the increase of voltage, the capacitance and loss of the ceramic material remain basically unchanged (the capacitance being ~53.5 pF, the loss being ~0.008), indicating that the dielectric constant and loss are basically unchanged. FIG. 9 shows the dielectric strength of the ceramics in this example as a function of thickness. It can be seen from FIG. 9 that, with the decrease of thickness, the dielectric strength (Eb) of the obtained ceramic material rises nonlinearly from 48 kV/mm (@1 mm) to 90 kV/mm (@0.1 mm).

EXAMPLE 2

$CaCO_3$, $SrCO_3$, $TiO_2$, $SiO_2$, and $Al_2O_3$ were weighed according to the formula of 22 mol % $CaTiO_3$+76.8 mol % $TiO_2$+0.2 mol % $SrTiO_3$+0.5 mol % $Al_2TiO_5$+0.5 mol % $SiO_2$, mixed by wet ball milling using water as the medium and agate balls as the grinding balls for 24 hours, discharged, and dried to give powders. The powders were presintered at 1100° C. for 4 hours, and then subjected to wet ball milling followed by drying, to give mixed powders having a particle size of 0.2 to 2 μm. The mixed powders were mixed with polyvinyl alcohol (PVA) at a ratio of 0.005 g PVA to 1 g mixed powders, and subjected to spray granulation, followed by isostatic pressing at a pressure of 200 MPa, to give a green body. The green body was sintered at 1310° C. for 6 hours, and then naturally cooled to room temperature to give a ceramic block.

Figure 10:
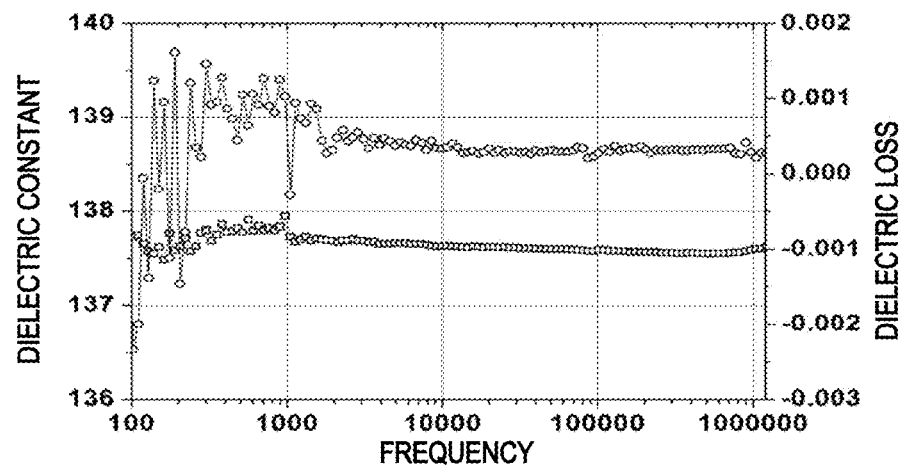
FIG. 10 shows the frequency dependence of the dielectric constant and loss of a standard ceramic sheet prepared in Example 2 of the present application.

FIG. 10 shows the frequency dependence of the dielectric constant and loss of the standard ceramic sheet (having a diameter of 30 mm and a thickness of 1 mm) prepared in this example. It can be seen from FIG. 10 that, in a frequency range of 100 Hz to 1 MHz, the dielectric constant and loss of the obtained ceramic material remain basically unchanged, the dielectric constant being about 137.5, and the dielectric loss being less than 0.002.

EXAMPLE 3

$CaCO_3$, $TiO_2$, $SiO_2$, and $Al_2O_3$ were weighed according to the formula of 29 mol % $CaTiO_3$+41 mol % $TiO_2$+12 mol % $Al_2TiO_5$+18 mol % $SiO_2$, mixed by wet ball milling using water as the medium and agate balls as the grinding balls for 24 hours, discharged, and dried to give powders. The powders were presintered at 1100° C. for 4 hours, and then subjected to wet ball milling followed by drying, to give mixed powders having a particle size of 0.2 to 2 μm. The mixed powders were mixed with polyvinyl alcohol (PVA) at a ratio of 0.008 g PVA to 1 g mixed powders, and subjected to spray granulation, followed by isostatic pressing at a pressure of 200 MPa, to give a green body. The green body was sintered at 1220° C. for 24 hours, and then naturally cooled to room temperature to give a ceramic block.

Figure 11:
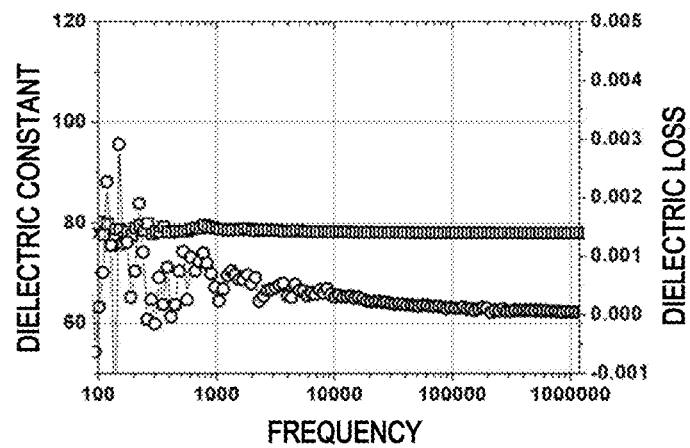
FIG. 11 shows the frequency dependence of the dielectric constant and loss of a standard ceramic sheet prepared in Example 3 of the present application.

FIG. 11 shows the frequency dependence of the dielectric constant and loss of the standard ceramic sheet (having a diameter of 30 mm and a thickness of 1 mm) prepared in this example. It can be seen from FIG. 11 that, in a frequency range of 100 Hz to 1 MHz, the dielectric constant and loss of the obtained ceramic material remain basically unchanged, the dielectric constant being about 80, and the dielectric loss being less than 0.003.

EXAMPLE 4

$CaCO_3$, $SrCO_3$, $TiO_2$, $SiO_2$, and $Al_2O_3$ were weighed according to the formula of 18 mol % $CaTiO_3$+49 mol % $TiO_2$+20 mol % $Al_2TiO_5$+13 mol % $SiO_2$, mixed by wet ball milling using water as the medium and agate balls as the grinding balls for 24 hours, discharged, and dried to give powders. The powders were presintered at 1050° C. for 4 hours, and then subjected to wet ball milling followed by drying, to give mixed powders having a particle size of 0.2 to 2 μm. The mixed powders were mixed with polyvinyl alcohol (PVA) at a ratio of 0.005 g PVA to 1 g mixed powders, and subjected to spray granulation, followed by isostatic pressing at a pressure of 200 MPa, to give a green body. The green body was sintered at 1240° C. for 6 hours, and then naturally cooled to room temperature to give a ceramic block.

Figure 12:
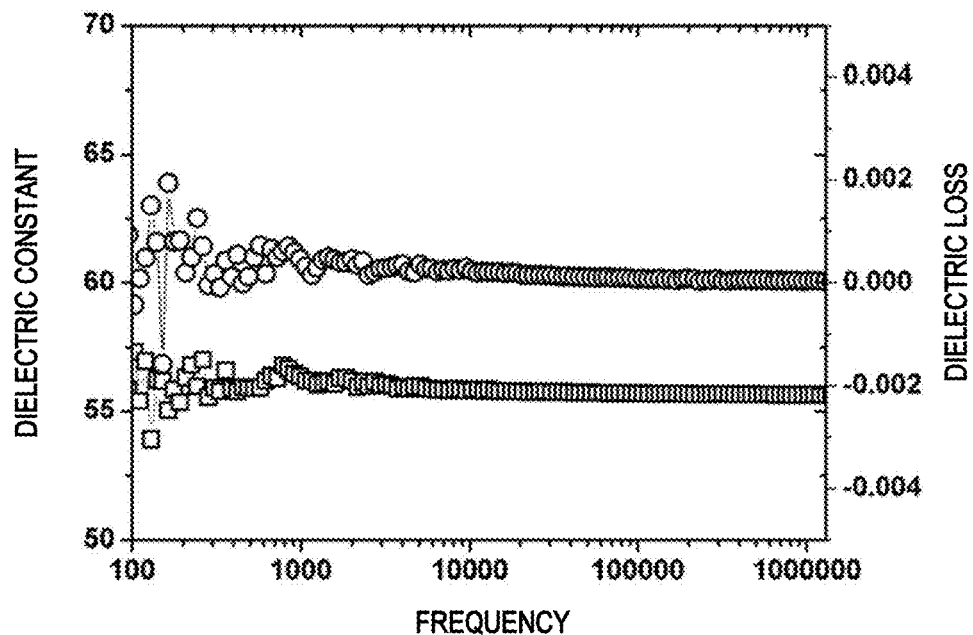
FIG. 12 shows the frequency dependence of the dielectric constant and loss of a standard ceramic sheet prepared in Example 4 of the present application.
Figure 13:
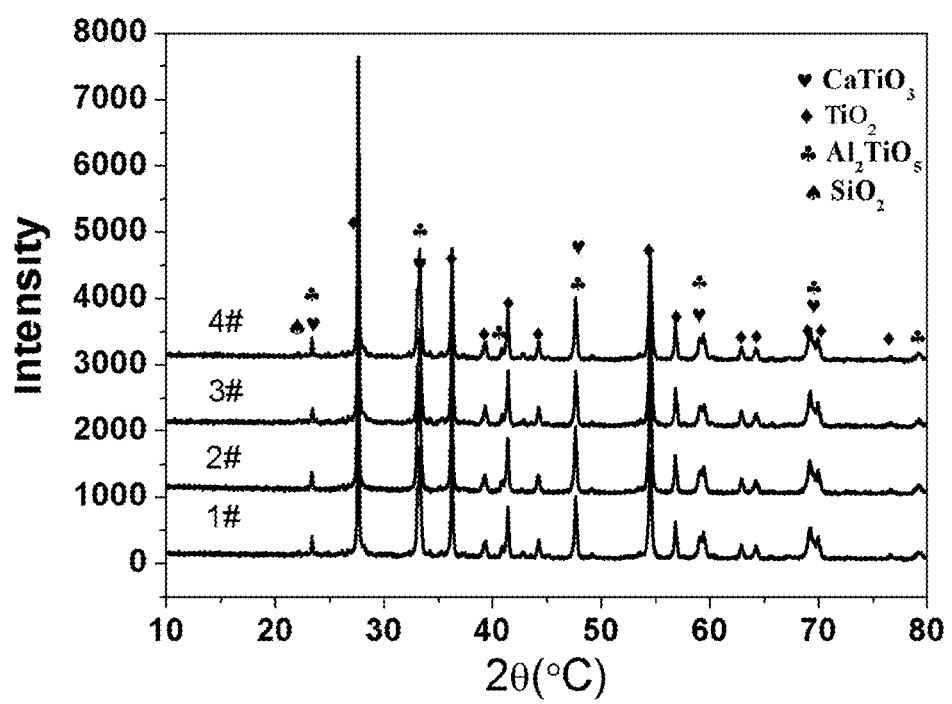
FIG. 13 shows the X-ray diffraction patterns of ceramics prepared in Example 1-4 of the present application.

FIG. 12 shows the frequency dependence of the dielectric constant and loss of the standard ceramic sheet (having a diameter of 30 mm and a thickness of 1 mm) prepared in this example. It can be seen from FIG. 12 that, in a frequency range of 100 Hz to 1 MHz, the dielectric constant and loss of the obtained ceramic material remain basically unchanged, the dielectric constant being about 60, and the dielectric loss being less than 0.0025.

of 48 kV/mm, a dielectric constant adjustable in a range of 50 to 250, and a dielectric loss of less than 0.003, which is very suitable for making low-capacity high-frequency capacitors, and pulse forming lines, and can be applied to devices such as pulse generators or phase shifters for drive sources of high power microwave machines, high power laser machines and X-ray machines, filters, oscillators, resonators and phased array antennas. In addition, the material has the advantages of good frequency stability, high voltage resistance, being lead-free and environmentally friendly, and a simple preparation process, and has significant application value.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:
1. A high-dielectric breakdown strength titanium oxide based dielectric ceramic material, a composition of the titanium oxide based dielectric ceramic material comprising:
a $CaTiO_3$+b $SrTiO_3$+c $TiO_2$+d $Al_2TiO_5$+e $SiO_2$,
wherein a, b, c, d, and e are a mole percentage of each component, 15≤a≤35 mol %, 0≤b≤2 mol %, 30≤c≤84 mol %, 0.5≤d≤25 mol %, 0.5≤e≤15 mol %, and a+b+c+d+e=100 mol %.

2. The titanium oxide based dielectric ceramic material according to claim 1, wherein the titanium oxide based dielectric ceramic material has a dielectric breakdown strength of 40 to 48 kV/mm, a dielectric constant adjustable in a range of 50 to 150, and a dielectric loss of less than 0.003.

3. The titanium oxide based dielectric ceramic material according to claim 1, wherein the titanium oxide based dielectric ceramic material has a size of 300 mm or greater in at least one dimension.

4. A method for preparing a large size, high-dielectric breakdown strength titanium oxide based dielectric ceramic material having a composition of a $CaTiO_3$+b $SrTiO_3$+c $TiO_2$+d $Al_2TiO_5$+e $SiO_2$, wherein a, b, c, d, and e are a mole percentage of each component, 15≤a≤35 mol %, 0≤b≤2 mol

TABLE 2

Compositions of the Cylindrical Ceramic Sheet (Having a Diameter of 6 mm and a Thickness of 3 mm) in the Examples and the Dielectric Constant, Dielectric Loss, and Dielectric Breakdown Strength thereof in a Frequency Range of 100 Hz to 1 MHz.

| | $CaTiO_3$ (mol %) | $TiO_2$ (mol %) | $SrTiO_3$ (mol %) | $Al_2TiO_5$ (mol %) | $SiO_2$ (mol %) | Dielectric Constant | Dielectric Loss | Dielectric Breakdown Strength (kV/mm) |
|---|---|---|---|---|---|---|---|---|
| Example 1 | 25 | 61 | — | 8 | 6 | 102 | <0.003 | 48 |
| Example 2 | 22 | 76.8 | 0.2 | 0.5 | 0.5 | 137.5 | <0.002 | 46 |
| Example 3 | 29 | 41 | — | 12 | 18 | 80 | <0.003 | 47 |
| Example 4 | 18 | 49 | | 20 | 13 | 55.7 | <0.003 | 40 |

From the above examples, it can be seen that, the present application prepares a large-size dielectric ceramic material via a conventional solid state method, which is, for example, a cuboid with a length of 300 mm, a width of 15 mm, and a thickness of 3 mm. Meanwhile, the dielectric ceramic material obtained can have a dielectric breakdown strength %, 30≤c≤84 mol %, 0.5≤d≤25 mol %, 0.5≤e≤15 mol %, and a+b+c+d+e=100 mol %, comprising the steps of:
weighing and mixing a calcium source, a titanium source, a strontium source, a silicon source and an aluminum source according to the composition, and presintering the mixture to obtain mixed powders;

adding a binder to the mixed powders, and subjecting the mixture to spray granulation and press molding to obtain a green body;

sintering the green body at 1220 to 1350° C. to obtain the high-dielectric breakdown strength titanium oxide based dielectric ceramic material.

5. The method according to claim 4, wherein the calcium source is at least one of CaO, $CaCO_3$, and $CaTiO_3$; the titanium source is at least one of $TiO_2$, $SrTiO_3$, $Al_2TiO_5$, and $CaTiO_3$; the strontium source is at least one of SrO, SrTiO3, and $SrCO_3$; the silicon source is $SiO_2$; and the aluminum source is at least one of $Al_2O_3$ and $Al_2TiO_5$.

6. The method according to claim 4, wherein the presintering is performed at 1000 to 1150° C. for a period of 2 to 12 hours.

7. The method according to claim 4, wherein the binder is at least one of polyvinyl alcohol, polyvinyl butyral, and methyl cellulose, and wherein the binder is added in an amount of 0.2 to 5% by weight with respect to a total mass of the mixed powders.

8. The method according to claim 4, wherein the period of sintering is 2 to 24 hours.

\* \* \* \* \*